United States Patent
Wu et al.

(10) Patent No.: US 8,531,832 B2
(45) Date of Patent: Sep. 10, 2013

(54) NOTEBOOK COMPUTER DEVICE WITH IMAGE CAPTURE MODULE

(75) Inventors: Hsien-Chih Wu, Taipei (TW); Hsin-Wen Tsai, Taipei (TW); Sheng-Ta Lin, Taipei (TW); Chiu-Lang Huang, Taipei (TW)

(73) Assignee: Asustek Computer Inc., Taipei (TW)

( * ) Notice: Subject to any disclaimer, the term of this patent is extended or adjusted under 35 U.S.C. 154(b) by 318 days.

(21) Appl. No.: 13/009,883

(22) Filed: Jan. 20, 2011

(65) Prior Publication Data
US 2011/0182029 A1  Jul. 28, 2011

(30) Foreign Application Priority Data

Jan. 22, 2010 (TW) .............................. 99101845 A

(51) Int. Cl.
  *G06F 1/16* (2006.01)
(52) U.S. Cl.
  USPC ................. 361/679.55; 348/333.12; 235/383; 455/418
(58) Field of Classification Search
  USPC ............... 348/207.11, 207.99, 374, 207.1, 348/143, 46, 14, 222.1, 242, 333.12; 235/454, 235/375, 462, 470, 383; 345/175, 173, 545, 345/633, 419, 418, 179, 180, 462; 361/679.55, 361/679.56, 679.41, 679.3, 679.01, 679.06, 361/679.4, 679.07; 358/488, 498, 474; 455/456, 566, 556.1, 418

See application file for complete search history.

(56) References Cited

U.S. PATENT DOCUMENTS

| | | | |
|---|---|---|---|
| 2006/0081709 A1* | 4/2006 | Chuang | 235/454 |
| 2008/0122937 A1* | 5/2008 | Lin et al. | 348/207.99 |
| 2011/0115924 A1* | 5/2011 | Yu et al. | 348/207.11 |

FOREIGN PATENT DOCUMENTS

TW 201117605 A1 5/2011

OTHER PUBLICATIONS

English translation of abstract of TW 201117605 A1.

* cited by examiner

*Primary Examiner* — Hung Duong
(74) *Attorney, Agent, or Firm* — McClure, Qualey & Rodack, LLP

(57) ABSTRACT

A notebook computer device includes an image capture module, a cover, a first magnetic element, and a second magnetic element. The image capture module is disposed on a body of the computer device, the cover is moveably disposed on the body. The image capture module is exposed when the cover is at a first position, and the image capture module is covered when the cover is at a second position. The first magnet element is disposed on the cover, and a second magnet element is disposed on the body corresponding to the first magnet element. The cover moves between a first position and a second position via the magnetic force of repulsion and attraction.

10 Claims, 12 Drawing Sheets

NOTEBOOK COMPUTER DEVICE WITH IMAGE CAPTURE MODULE

CROSS-REFERENCES TO RELATED APPLICATIONS

This non-provisional application claims priority under 35 U.S.C. §119(a) on Patent Application No. 99101845 filed in Taiwan, R.O.C. on 2010 Jan. 22, the entire contents of which are hereby incorporated by reference.

BACKGROUND OF THE INVENTION

1. Field of the Invention

The invention relates to a notebook computer device and, more particularly, to a notebook computer device with an image capture module.

2. Description of the Related Art

With the development of the Internet and the maturity of photographic imaging technology, image capture modules are mass-produced, and the market price of the image capture module is accepted by most consumers. Therefore, the image capture module is widely used, and users interactively communicate with others via the video and audio on the Internet.

Due to powerful functions and the convenience, the notebook computers embedded with the image capture module are favored by users. The image capture module embedded with the image capture module is usually disposed on the top of a display to facilitate the user shooting and remote video communication.

However, the image capture module embedded with the image capture module is often directly exposed without protection, and thus the module is easily contaminated. Furthermore, when the notebook computer device is attacked by viruses or hackers, the module may automatically turn on due to an improper control. Consequently, personal privacy images may be leaked, and they may be stolen and spread on the Internet by others.

BRIEF SUMMARY OF THE INVENTION

The invention provides a notebook computer device with an image capture module. The notebook computer device includes an image capture module, a cover, a first magnetic element, and a second magnetic element. The image capture module is disposed at the body of the notebook computer device. The cover is moveably disposed at the body of the notebook computer device. When the cover moves to the first position, the image capture module is exposed. When the cover moves to the second position, the image capture module is covered. A first magnetic element is disposed at the cover, and a second magnetic element is disposed at the body corresponding to the first magnetic element. Via the magnetic force of repulsion or attraction, the first magnetic element and the second magnetic element make the cover move between the first position and the second position.

As stated above, the notebook computer device includes a cover to cover the image capture module. Thus, with the protection of the cover, the image capture module is not easily contaminated by the dust and fingerprints. Moreover, when a user pushes the cover across the second magnetic element, the cover automatically moves to the first position or the second position via the magnetic force of repulsion or attraction between the first and the second magnetic element. Therefore, the cover can semi-automatically slide, and the user may move the cover more smoothly.

In addition, the body can drive corresponding program demands according to that the cover is at the first position or the second position. For example, when the cover moves to the first position, instant communication software such as MSN and SKYPE starts. As a result, users can automatically drive the instant communication software by opening the image capture module. With a pop-up window, a marquee, or a sound message and so on, the devices can also prompt the user whether the image capture module is opened or closed according to the position of the cover.

DETAILED DESCRIPTION OF THE EMBODIMENTS

Figure 1:
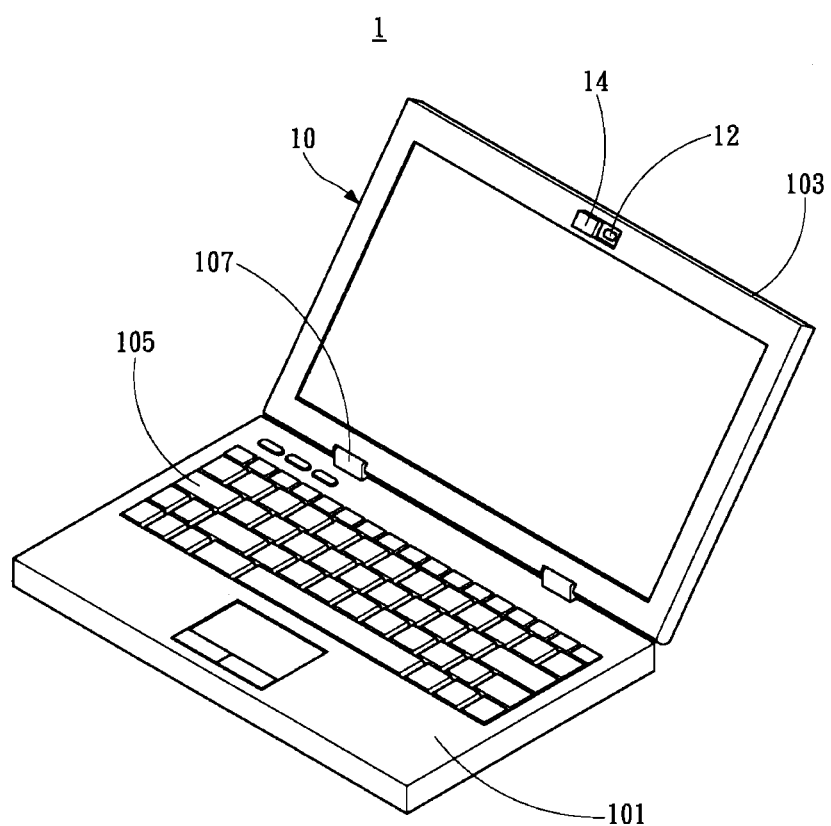
FIG. 1 is a schematic diagram showing the notebook computer device in a first embodiment.
Figure 2:
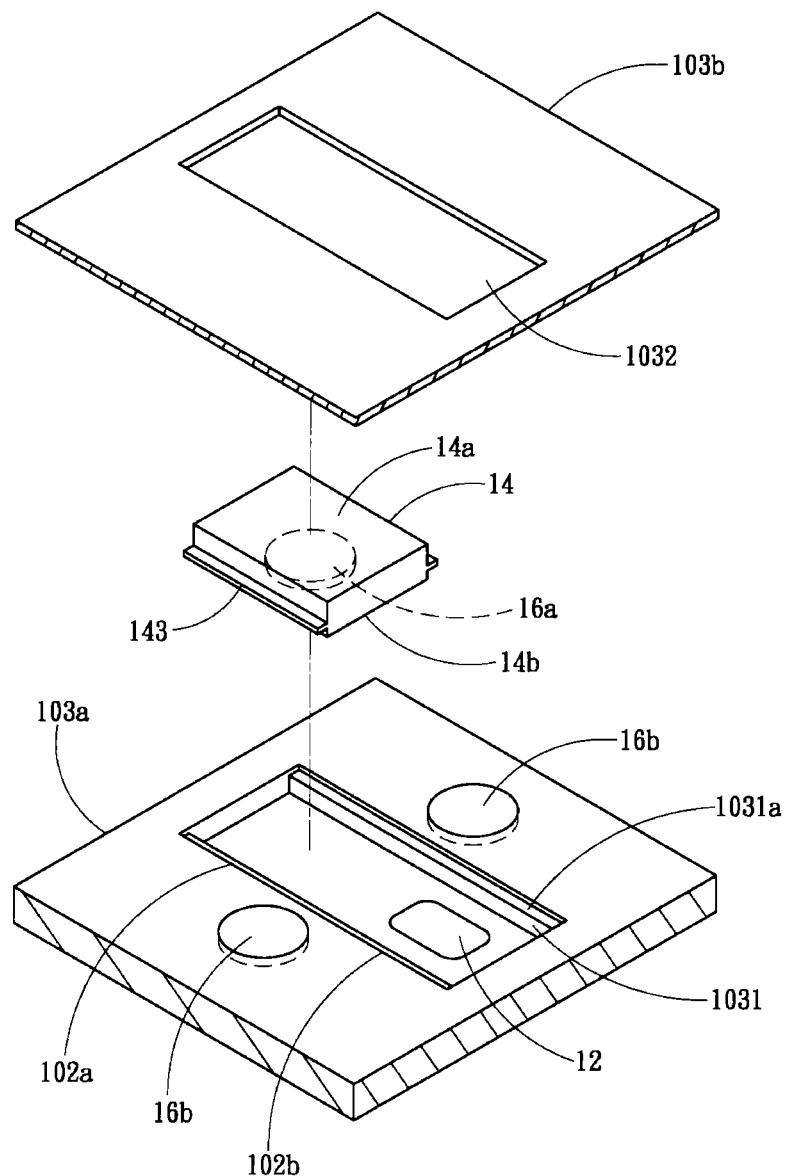
FIG. 2 is a exploded diagram showing the cover, the shell body and the shell cover in a first embodiment.

In FIG. 1, FIG. 2, FIG. 3A and FIG. 3B, a notebook computer device 1 with an image capture module in a first embodiment includes a device body 10, an image capture module 12, a cover 14, a first magnetic element 16a and a second magnetic element 16b.

The device body mainly includes a host 101, a display 103 and a keyboard 105, and is not limited thereto. The host includes a main board (not shown), a CPU (not shown), and a memory to process various kinds of electric data.

The display 103 is pivotally connected to the host 101 via a hinge 107. The display 103 includes a shell body 103a and a shell cover 103b. A slot 1031 is formed on the top of the shell body 103a. One end of the slot 1031 is a first position 102a, and the other end is a second position 102b. The shell cover 103b includes a slot hole 1032 corresponding to the position of the slot 1031.

The keyboard 105 is used for inputting data, and it is preferably disposed on the surface of the host 101 and faces the display 103. The image capture module 12 is disposed at the second position 102b of the display 103. The image capture module is used for capturing the image data recorded by a user, and it even may be used to interact with the remote users.

The cover 14 is used for protecting and covering the image capture module 12. The cover includes a front side 14a and a corresponding back side 14b. The cover 14 is disposed in the slot 1031 of the display 103 and moves along the slot 1031 between the first position 102a and the second position 102b. The image capture module 12 exposes the slot 1031 when the cover 14 is at the first position 12a, and the image capture module 12 is covered by the cover 14 when the cover 14 moves to the second position 12b. In other words, the image capture module 12 is opened when the cover 14 moves to the first position 12a, and the image capture module 12 is closed, when the cover 14 is at the second position 102b.

The first magnetic element 16a is disposed at the back side 14b of the cover 14, the area of the first magnetic element 16a is smaller than that of the cover 14, and is not limited thereto. The first magnetic element 16a may be cover-shaped and used as the cover 14.

The second magnetic element 16b is disposed at a side of the slot 1031 of the shell body 103a, and it is between the first position 102a and the second position 102b. The first magnetic element 16a and the second magnetic element 16b include the same polarity. Thus, the magnetic force of repulsion between the first magnetic element 16a and the second magnetic element 16b make the cover 14 at the first position 102a or the second position 102b.

Figure 3A:
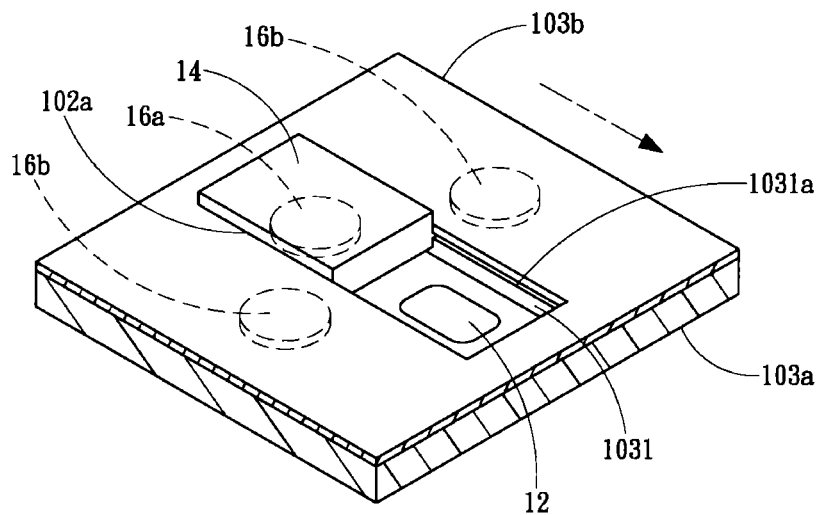
FIG. 3A to 3D is a schematic diagram showing the cover, the image capture module, the first magnetic element and the second magnetic element of the display in a first embodiment.
Figure 3B:
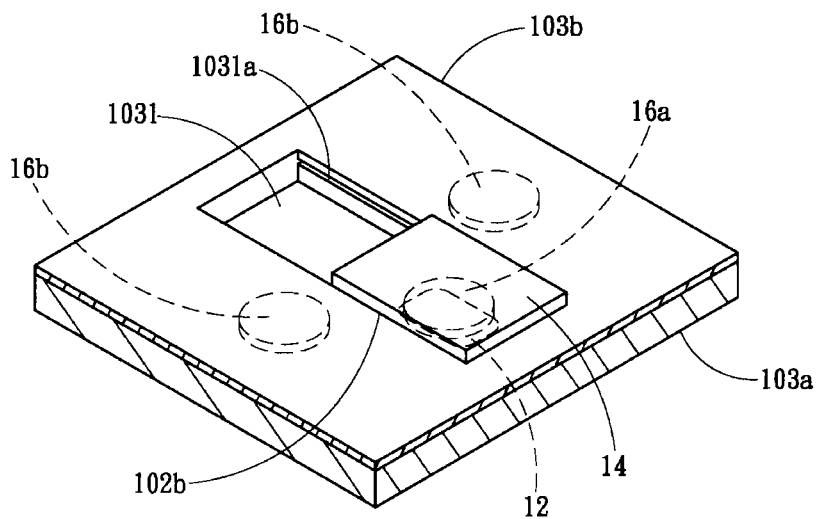
Figure 3C:
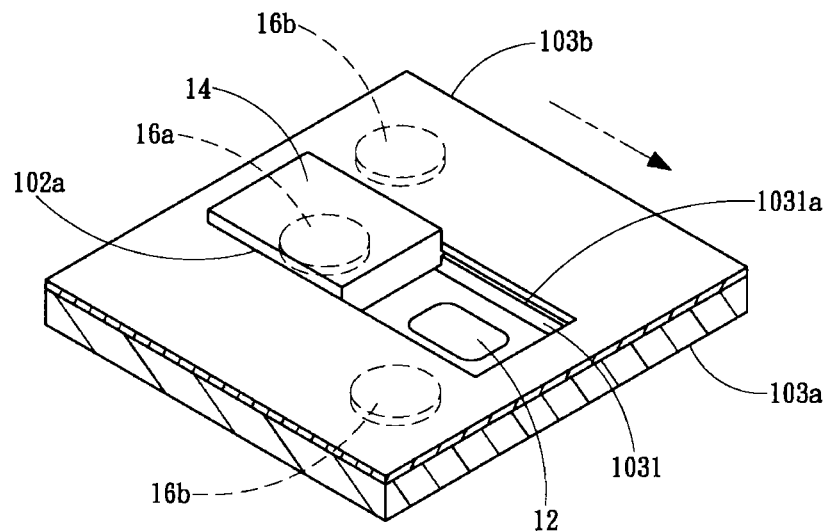
Figure 3D:
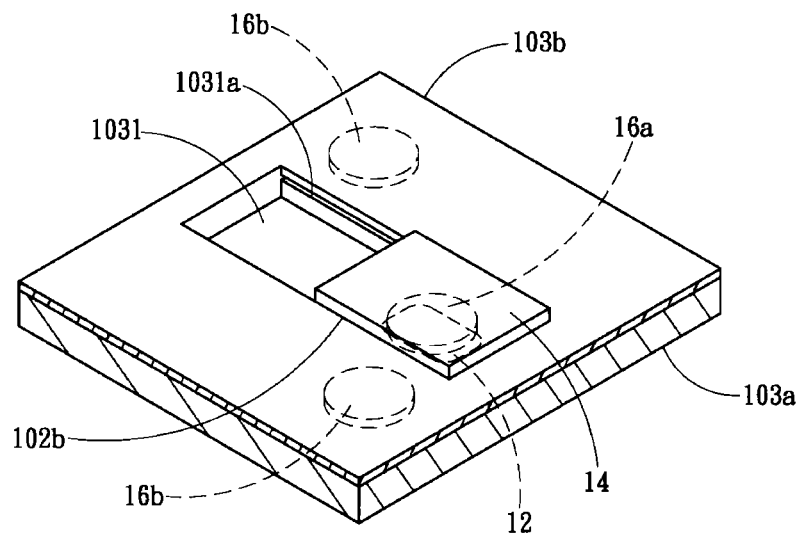

Furthermore, when the first magnetic element 16a and the second magnetic element 16b include opposite polarity, as shown in FIG. 3C and FIG. 3D, the second magnetic elements 16b are parallelly disposed corresponding to the first position 102a or the second position 102b, respectively. The magnetic force of attraction between the first magnetic element 16a and the second magnetic element 16b makes the cover 14 at the first position 102a or the second position 102b.

The position of the second magnetic element 16b stated above is just taken as examples, and is not limited thereto. The second magnetic element 16b also may be disposed in the slot 1031 of the shell body 103a between the first position 102a and the second position 102b.

The slot 1031 of the display 103 includes a positioning part 1031a. An embedding part 143 is disposed at the side of the cover 14, and the embedding part 143 may be embedded into the positioning part 1031a to locate the cover 14 in the slot 1031. In the embodiment, the positioning part 1031a is runner-shaped, and the embedding part 143 is in a protruding block. Thus, the embedding part 143 can be embedded into the positioning part 1031a. The above positioning part 1031a and the above embedding part 143 are just examples, and is not limited thereto.

Figure 4A:
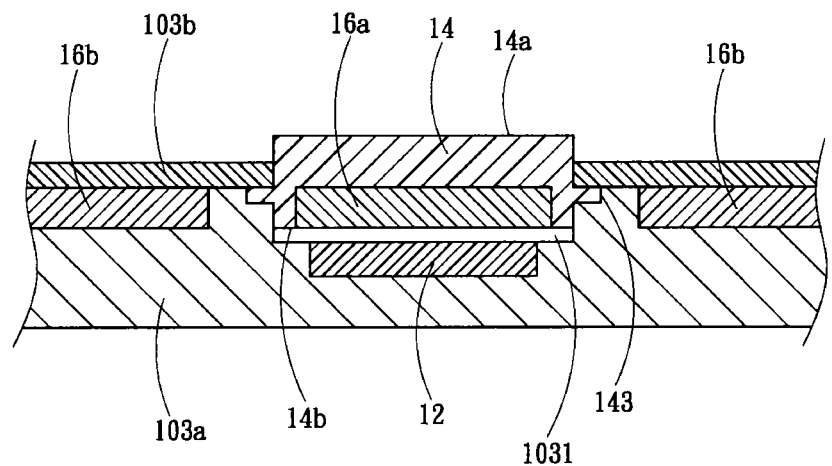
FIG. 4A is a sectional schematic diagram showing that the image capture module is covered by the cover in a first example of the first embodiment.
Figure 4B:
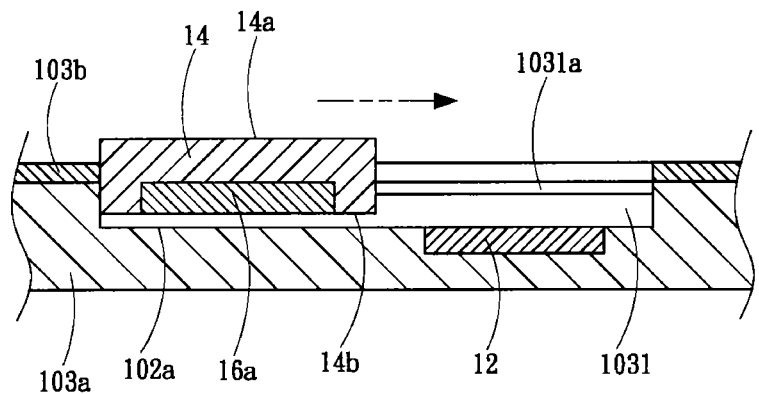
FIG. 4B is a sectional schematic diagram showing that the cover is at the first position in a first example of the first embodiment.
Figure 4C:
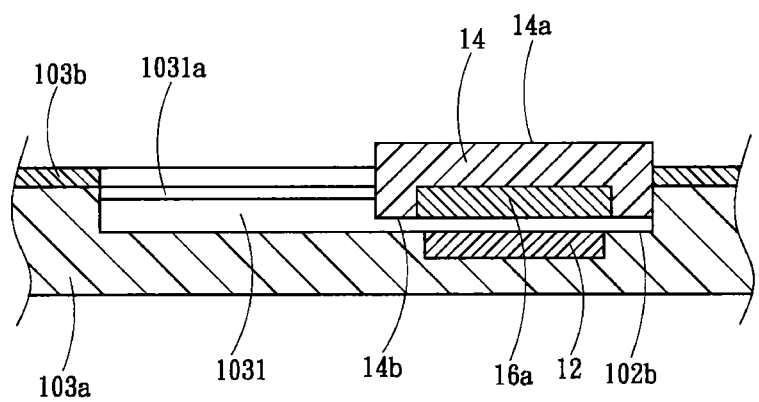
FIG. 4C is a sectional schematic diagram showing that the cover is at the second position in a first example of the first embodiment.
Figure 5A:
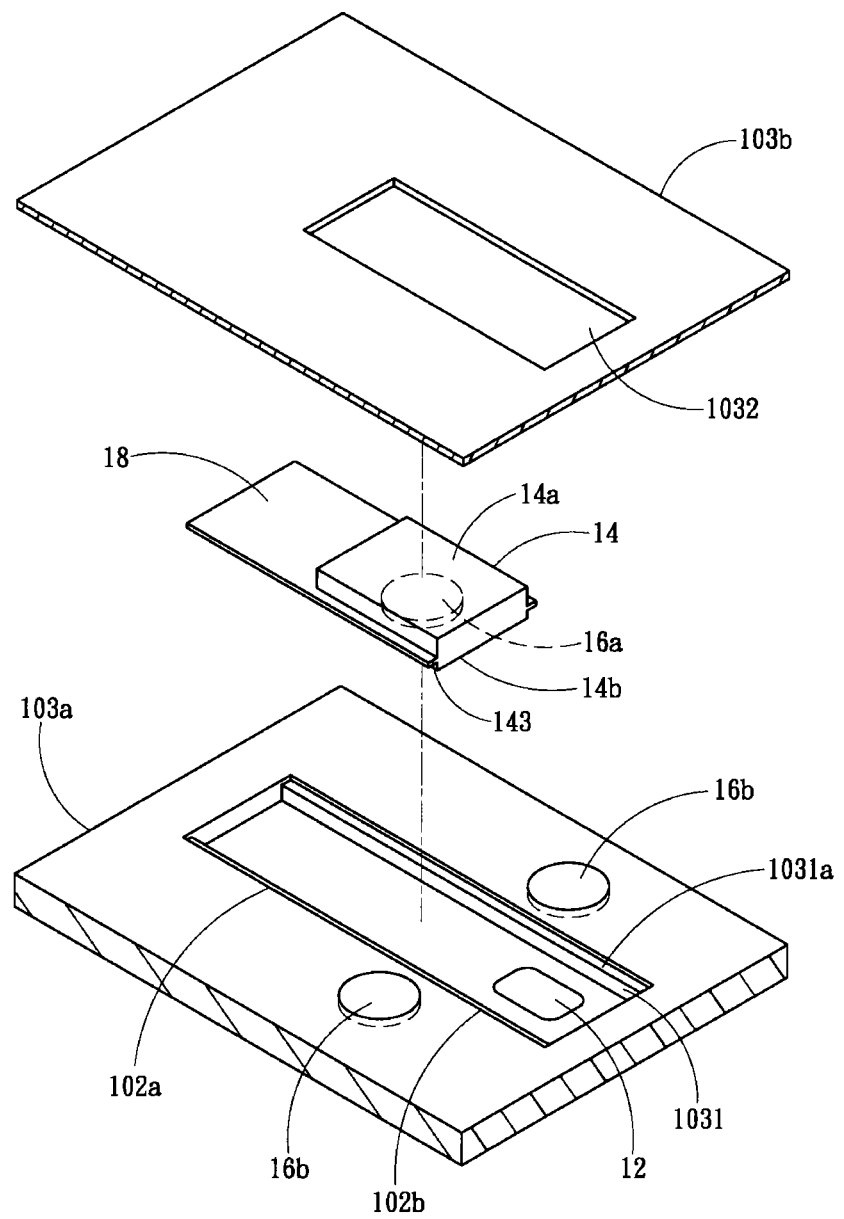
FIG. 5A is a sectional schematic diagram showing the cover, shell body and the shell cover in a second example of the first embodiment.
Figure 5B:
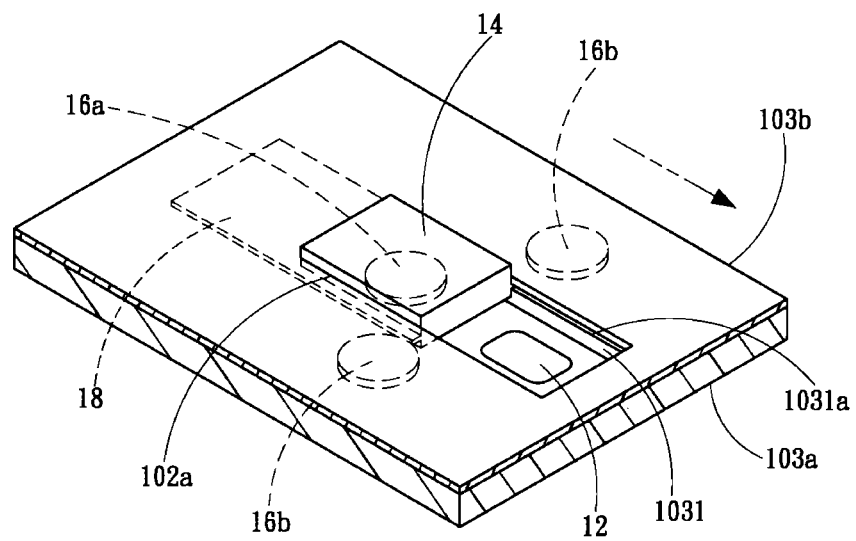
FIGS. 5B and 5D are sectional schematic diagrams showing that the cover is at the first position in a second example of the first embodiment.
Figure 5C:
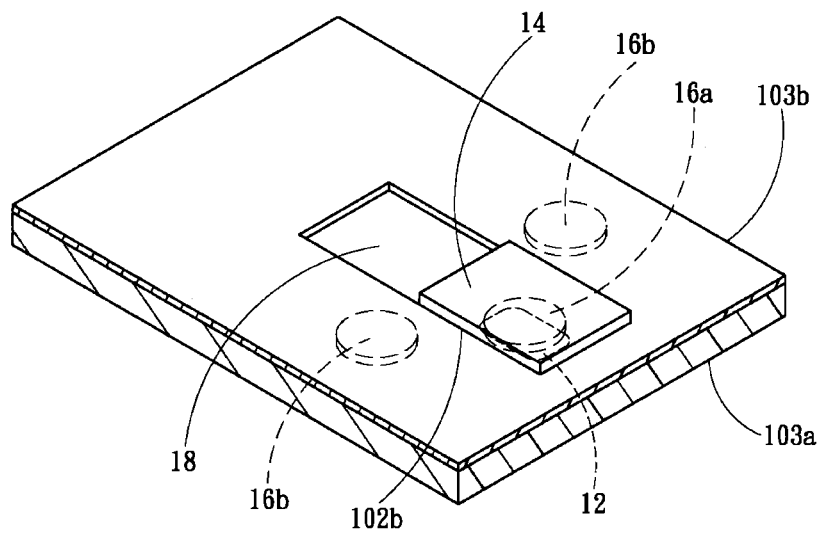
FIGS. 5C and 5E are sectional schematic diagrams showing that the cover is at the second position in a second example of the first embodiment.
Figure 5D:
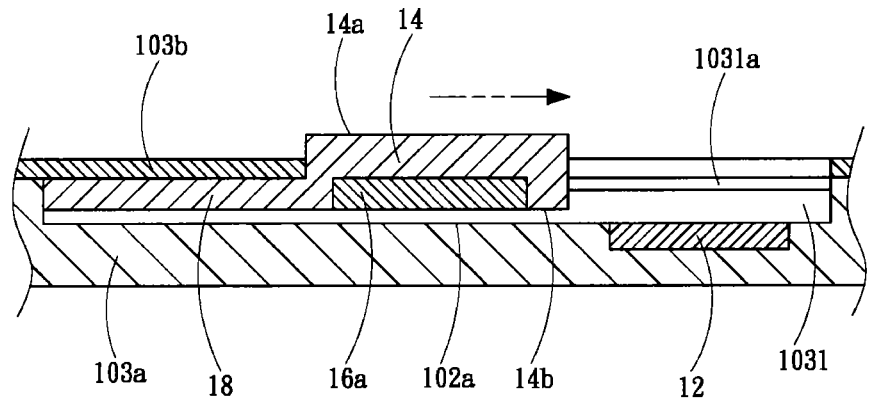
Figure 5E:
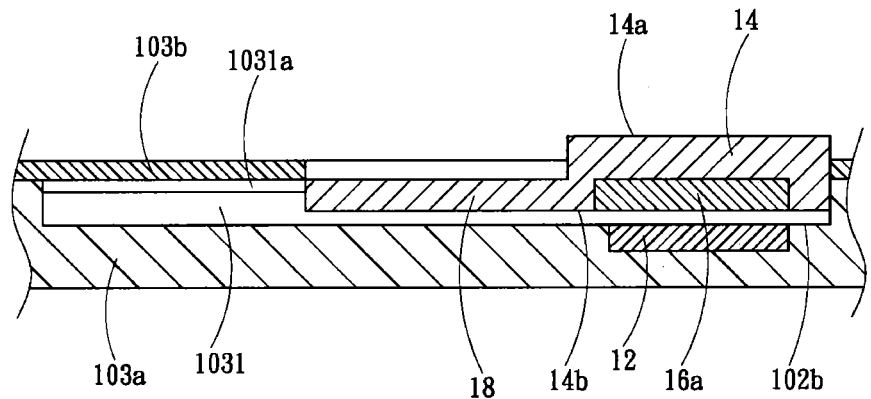
Figure 6A:
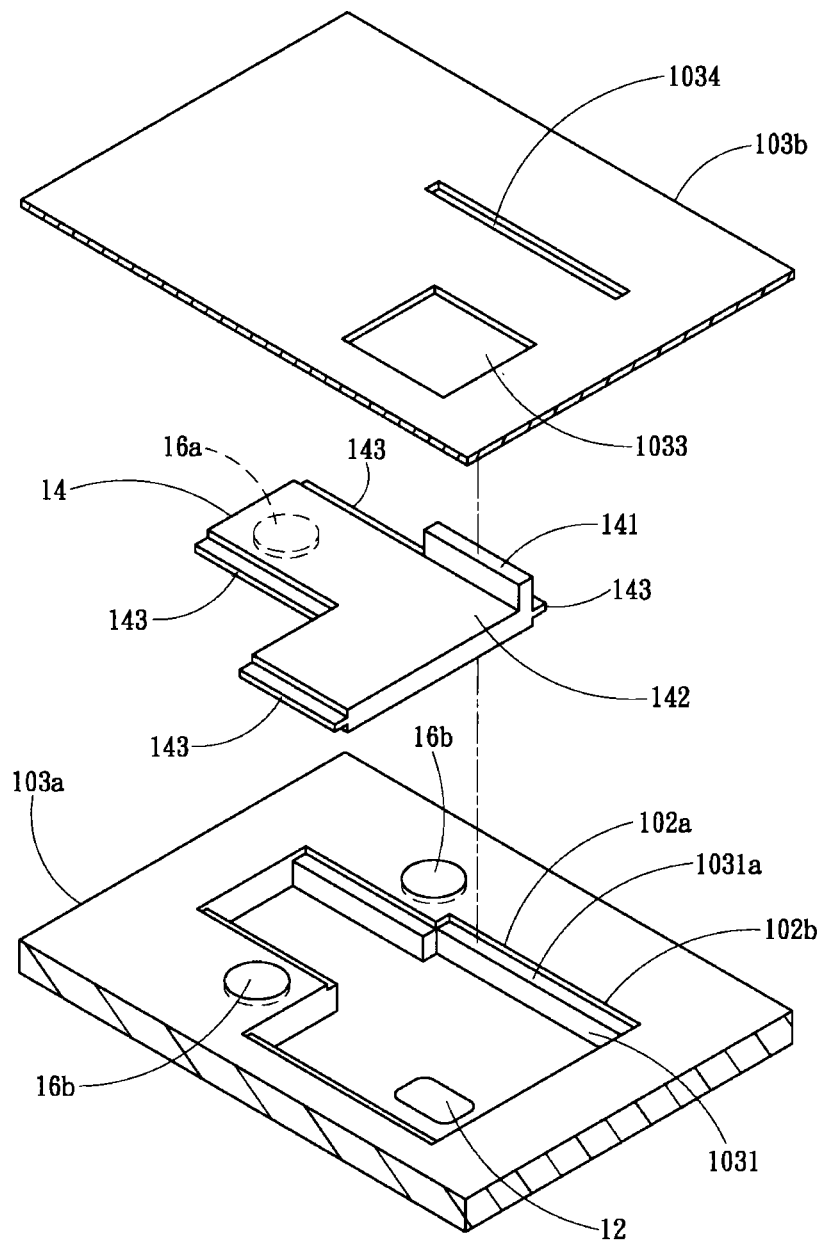
FIG. 6A is a exploded diagram showing that the cover, the shell body and the shell cover in a third example of the first embodiment.
Figure 6B:
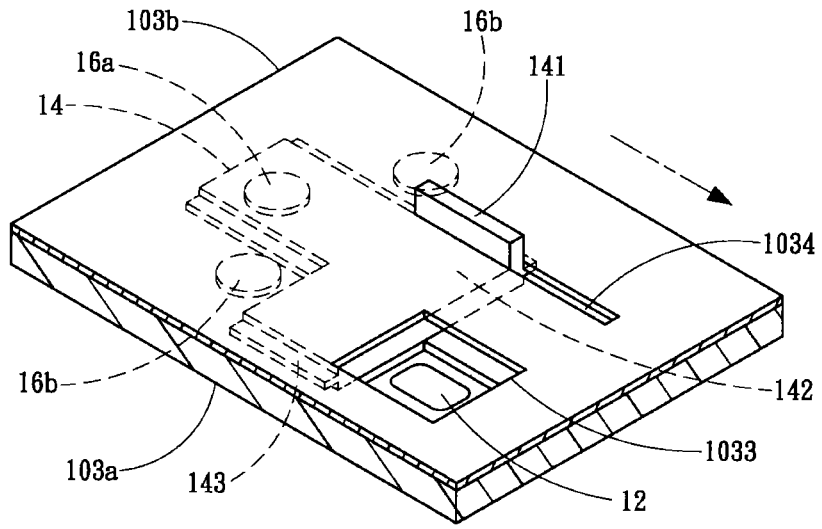
FIGS. 6B and 6D are sectional schematic diagrams showing that the cover is at the first position in a third example of the first embodiment.
Figure 6C:
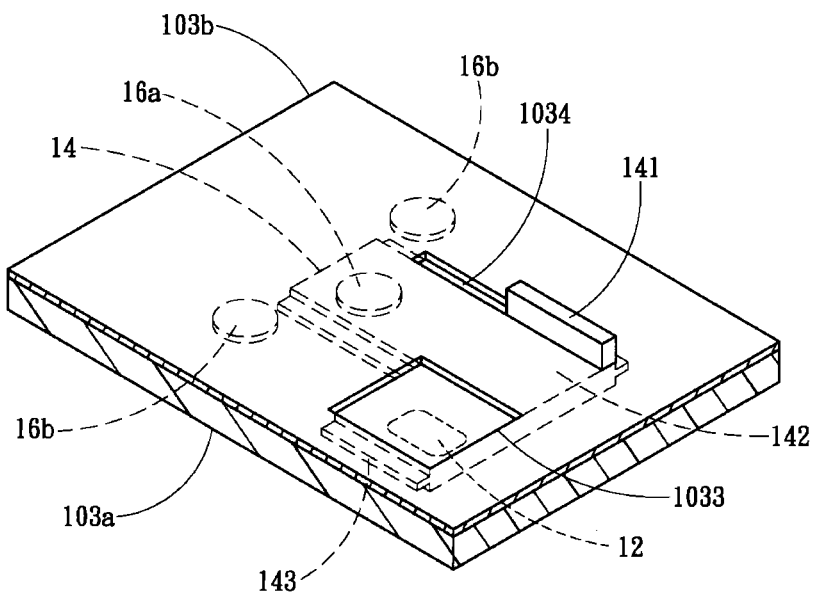
FIGS. 6C and 6E are sectional schematic diagrams showing that the cover is at the second position in a third example of the first embodiment.
Figure 6D:
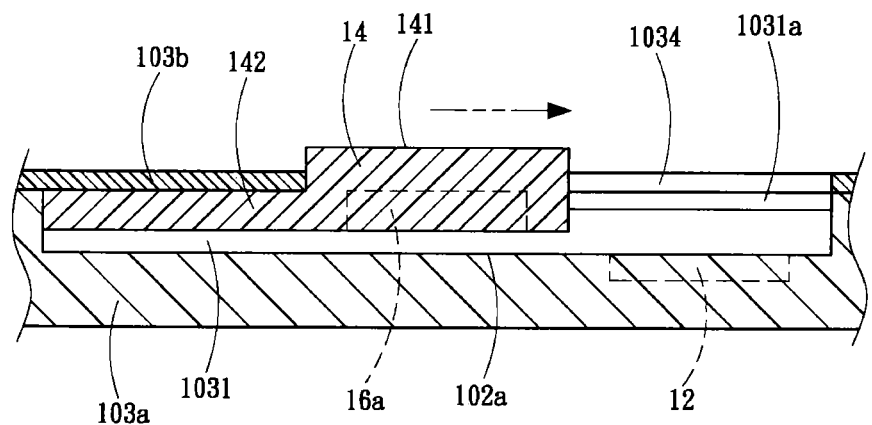
Figure 6E:
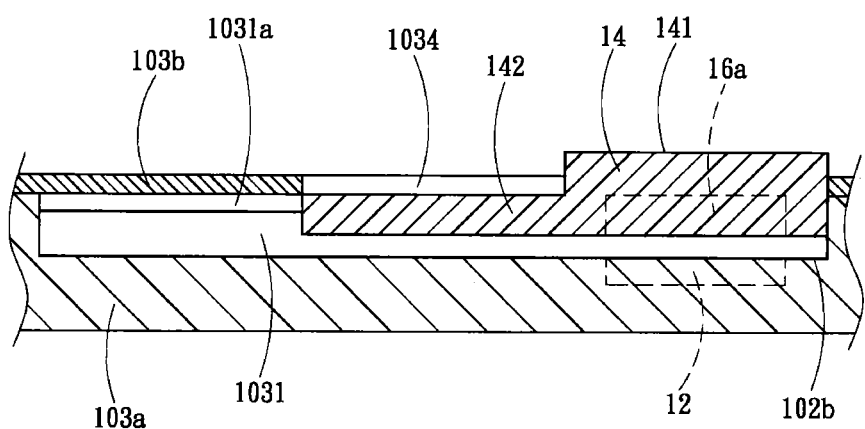

The first example of the embodiment is shown in FIG. 4A to 4C. The image capture module 12 is at the second position 102b of the slot 1031. The image capture module 12 is exposed when the cover 14 is at the first position 102a. When the cover 14 is at the second position 102b, the image capture module 12 is covered, and the slot 1031 is exposed. When the user pushes the front side 14a of the cover 14 across the second magnetic element 16b, the cover 14 can automatically move to the first position 102a or the second position 102b via the magnetic force of repulsion or attraction between the first magnetic element 16a and the second magnetic element 16b. The force for pushing the cover 14 only needs to be larger than the magnetic force of repulsion or attraction between the first magnetic element 16a and the second magnetic element 16b. Consequently, the user can easily push the cover 14, and the cover 14 can semi-automatically slide.

The second example of the embodiment is shown in FIG. 5A to 5E. In the example, the cover 14 includes an extending part 18 at one side. When the cover 14 is at the second position 102b, the image capture module 12 is covered, and the slot 1031 is covered by the extending part 18. The side part of the extending part 18 can be embedded into the positioning part 1031a directly. When the cover 14 is at the first position 102a, the extending part 18 can be embedded into a recessed accommodating space of the shell body 103a. The recessed accommodating space also may be disposed at the shell cover 103b or between the shell body 103a and the shell cover 103b.

The third example of the embodiment is shown is FIG. 6A to 6E. In the example, the shell cover 103b of the display 103 includes a through hole 1033 and a sliding hole 1034. The cover 14 includes a pushing part 141 and a cover part 142, and the cover part 142 is a board approximately in L shape. The pushing part 141 is at one side of the cover part 142, and it is approximately vertical to the cover part 142. The through hole 1033 is used for exposing the image capture module 12, and the sliding hole 1034 is used for the pushing part 141 passing through The through hole 1033 exposes the image capture module 12 when the user pushes the pushing part 141 to move the cover 14 to the first position 102a, and the cover part 142 covers the image capture module 12 when the cover 14 moves to the second position 102b.

The position, the shape, and the structure of the image capture module 12, the cover 14, the first magnetic element 16a and the second magnetic element 16b in the above embodiment are just examples, and is not limited thereto.

The notebook computer device 1 with the image capture module 12 in the second embodiment includes the device body 10, the image capture module 12, the cover 14, the first magnetic element 16a and the second magnetic element 16b. The usage and the relationship of those components are the same as that of the components in the first embodiment.

In the notebook computer device 1 in the embodiment, the device body 10 can enable a program demand, preferably instant communication software, according to that the cover 14 is at the first position 102a or the second position 102b. By opening or closing the image capture module 12, the user can enable the instant communication software (such as MSN and SKYPE) to interact with others with remote multimedia. The above embodiment is just an example, and is not limited thereto. The program demand also may be a pop-up window, a marquee, or a sound message and so on. Furthermore, the user can set a needed message or software to be the program demand according to his or her habit, which is more convenient.

In the first example of the embodiment, the program demand is enabled when the cover 14 is at the first position 102a, and the program demand is disabled when the cover 14 is at the second position 102b.

In the second example of the embodiment, the program demand includes a prompting massage to prompt that the cover 14 is at the first position 102a or the second position 102b. When the cover 14 is at the first position 102a, and that is, the cover is opened and not covered, since the notebook computer device 1 may be attacked by viruses or hackers, the image capture module 12 may be improperly controlled. Consequently, the personal privacy images may be leaked, and they may be stolen and spread on the internet by others. Thus, the prompting massage prompts the state (the open or close state) of the image capture module 12 to the user to prevent the personal privacy images from being stolen.

As stated above, the cover 14 can move to the first position 102a (the image capture module 12 is fully exposed) or the second position 102b (the image capture module 12 is covered) via the magnetic force of repulsion or attraction between the first magnetic element 16a and the second magnetic element 16b. Consequently, the cover 14 can semi-automatically slide, and the user may push the cover 14 more smoothly. Thus, even if the user doesn't push the cover 14 to the first position 102a (or the second position 102b) exactly, the cover 14 can move automatically to the first position 102a (or the second position 102b) via the magnetic force of repulsion or attraction instead of staying between the first position 102a and the second position 102b when the image capture module 12 is half-opened.

Moreover, the device body 10 can drive the corresponding program demand according to that the cover 14 is at the first position 102a or the second position 102b. Thus, the convenience is improved, and the user can be prompted about the state (enabled or disabled) of the image capture module 12 to prevent the personal privacy images from being stolen and prevent the personal privacy from being spread.

Although the present invention has been described in considerable detail with reference to certain preferred embodiments thereof, the disclosure is not for limiting the scope of the invention. Persons having ordinary skill in the art may make various modifications and changes without departing from the scope. Therefore, the scope of the appended claims should not be limited to the description of the preferred embodiments described above.

What is claimed is:

1. A notebook computer device comprising:
   an image capture module disposed at a body of the notebook computer device;
   a cover moveably disposed at the body, wherein the image capture module is exposed when the cover is at a first position, and the image capture module is covered when the cover is at a second position;
   a first magnetic element disposed at the cover; and
   a second magnetic element disposed at the body corresponding to the first magnetic element, wherein the cover moves between the first position and the second position via a magnetic force of repulsion or attraction between the first magnetic element and the second magnetic element.

2. The notebook computer device according to claim 1, wherein the device body drives a program demand according to that the cover is at the first position or the second position.

3. The notebook computer device according to claim 2, wherein the program demand comprises a prompting massage for showing that the cover is at the first position or the second position.

4. The notebook computer device according to claim 2, wherein the program demand is enabled when the cover is at the first position, and the program demand is disabled when the cover is at the second position.

5. The notebook computer device according to claim 1, wherein the body comprises a slot, the first position and the second position are at two ends of the slot, the second magnetic element is at a side of the slot, and the cover moves along the slot via the magnetic force of repulsion or attraction.

6. The notebook computer device according to claim 5 further comprising an extending part connected to the cover, wherein when the cover is at the second position, the cover covers the image capture module, and the extending part covers the slot.

7. The notebook computer device according to claim 5, wherein the device body comprises a through hole used for exposing the image capture module.

8. The notebook computer device according to claim 5, wherein the slot comprises a positioning part, and the cover comprises an embedding part embedded into the positioning part to locate the cover in the slot.

9. The notebook computer device according to claim 5, wherein the second magnetic element locates between the first position and the second position when the first magnetic element and the second magnetic element have the same polarity.

10. The notebook computer device according to claim 5, wherein the second magnetic element is at the first position or the second position when the first magnetic element and the second magnetic element have opposite polarity.

* * * * *